(12) United States Patent
Voisembert (10) Patent No.: US 10,589,434 B2
(45) Date of Patent: Mar. 17, 2020

(54) VARIABLE GEOMETRY AND STEADY VOLUME INFLATABLE TUBE, ROBOTIC ARM AND ROBOT

(71) Applicant: WAREIN, Mayenne (FR)

(72) Inventor: Sébastien Voisembert, Mayenne (FR)

(73) Assignee: WAREIN, Mayenne (FR)

( * ) Notice: Subject to any disclaimer, the term of this patent is extended or adjusted under 35 U.S.C. 154(b) by 0 days.

(21) Appl. No.: 16/191,798

(22) Filed: Nov. 15, 2018

(65) Prior Publication Data

US 2019/0143539 A1   May 16, 2019

(30) Foreign Application Priority Data

Nov. 16, 2017   (FR) ...................................... 17 71220

(51) Int. Cl.
*B25J 18/06* (2006.01)
*B25J 9/14* (2006.01)
*B25J 9/10* (2006.01)

(52) U.S. Cl.
CPC ............... *B25J 18/06* (2013.01); *B25J 9/104* (2013.01); *B25J 9/142* (2013.01)

(58) Field of Classification Search
CPC ............. B25J 18/06; B25J 9/104; B25J 9/142
See application file for complete search history.

(56) References Cited

U.S. PATENT DOCUMENTS

| | | | | |
|---|---|---|---|---|
| 5,317,952 | A * | 6/1994 | Immega | B25J 9/104 74/490.04 |
| 9,016,159 | B2 * | 4/2015 | Kell | A61B 1/00078 74/490.04 |
| 9,908,243 | B2 * | 3/2018 | Ziv-Av | B25J 18/06 |
| 10,046,462 | B2 * | 8/2018 | Knopf | B25J 9/142 |
| 10,238,460 | B2 * | 3/2019 | Stand | A61B 34/71 |
| 10,363,670 | B1 * | 7/2019 | Gundling | B25J 18/06 |
| 10,500,373 | B2 * | 12/2019 | Barrish | A61M 25/04 |
| 2013/0091974 | A1 | 4/2013 | Riwan et al. | |

FOREIGN PATENT DOCUMENTS

| | | |
|---|---|---|
| FR | 2 587 644 A1 | 3/1987 |
| FR | 2 960 468 A1 | 12/2011 |
| FR | 3 004 376 A1 | 10/2014 |
| WO | 2016/167851 A2 | 10/2016 |

OTHER PUBLICATIONS

FR Search Report and Written Opinion issued in French Patent Application No. FR1771220.

* cited by examiner

*Primary Examiner* — David M Fenstermacher
(74) *Attorney, Agent, or Firm* — Young & Thompson (57) ABSTRACT

Disclosed is a variable geometry and constant-volume inflatable tube, including an inflatable envelope having a central axis. A stress-bearing unit is provided, including a pair of first and second inextensible link belonging to a same longitudinal half-plane of the envelope, the first unit being oriented along a first longitudinal direction inclined with respect to the central axis and the second unit being oriented along a second longitudinal direction which is also inclined with respect to the central axis but which crosses the first direction on the central axis. The inflatable tube can be bent around a first or second pivot axis, the longitudinal tensile stresses applied to the envelope then being concentrated on the central axis.

20 Claims, 6 Drawing Sheets

Fig.1

Prior art

Fig.2

Prior art

VARIABLE GEOMETRY AND STEADY VOLUME INFLATABLE TUBE, ROBOTIC ARM AND ROBOT

BACKGROUND OF THE INVENTION

Field of the Invention

The present invention relates to the field of the joints of a poly-articulated robotic arm with a high slenderness—that is to say an arm having a long length for a small external diameter—allowing to inspect environments which are congested, difficult to access, hostile for humans (chemical or radiological risks) or large.

More particularly, the present invention relates to a variable geometry and constant-volume inflatable tube, to a robotic arm comprising at least one such inflatable tube and to a robot equipped with said robotic arm.

Description of the Related Art

Robots with a high slenderness are known, having rigid segments articulated by pivot, slide or sliding pivot-type linkages. Such robots can be maneuvered with very precision, but their weight, due to the weight of the rigid segments and of the mechanical linkages linking them, makes their deployment difficult and limits the slenderness which can be achieved in practice.

Inflatable robotic structures, for instance constant-volume joints, are also known.

Figure 1:
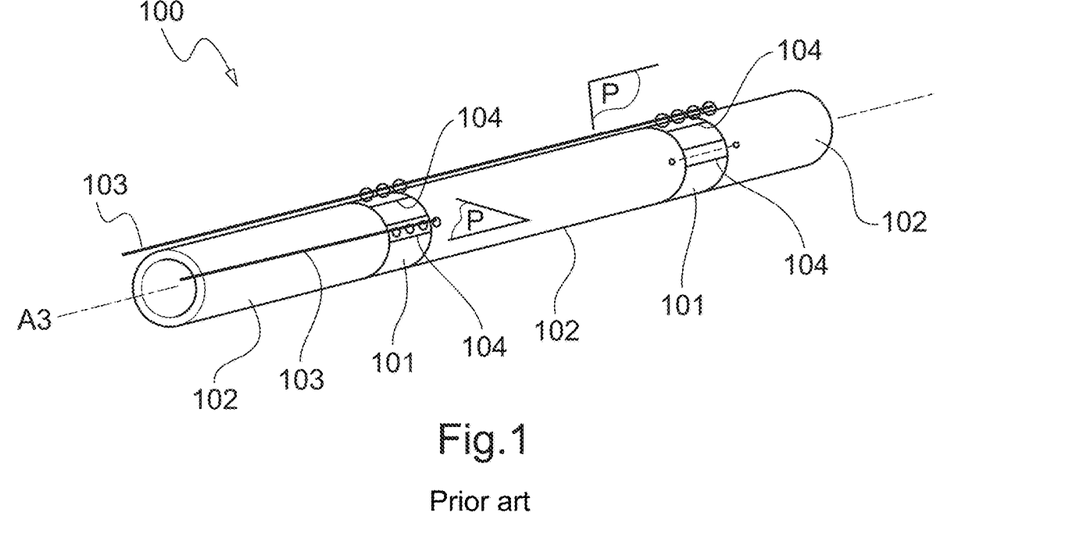
FIGS. 1 and 2 are schematic views of a robotic arm and of a part of a variable geometry section respectively, according to the prior art, namely according to patent application FR3004376 A1.
Figure 2:
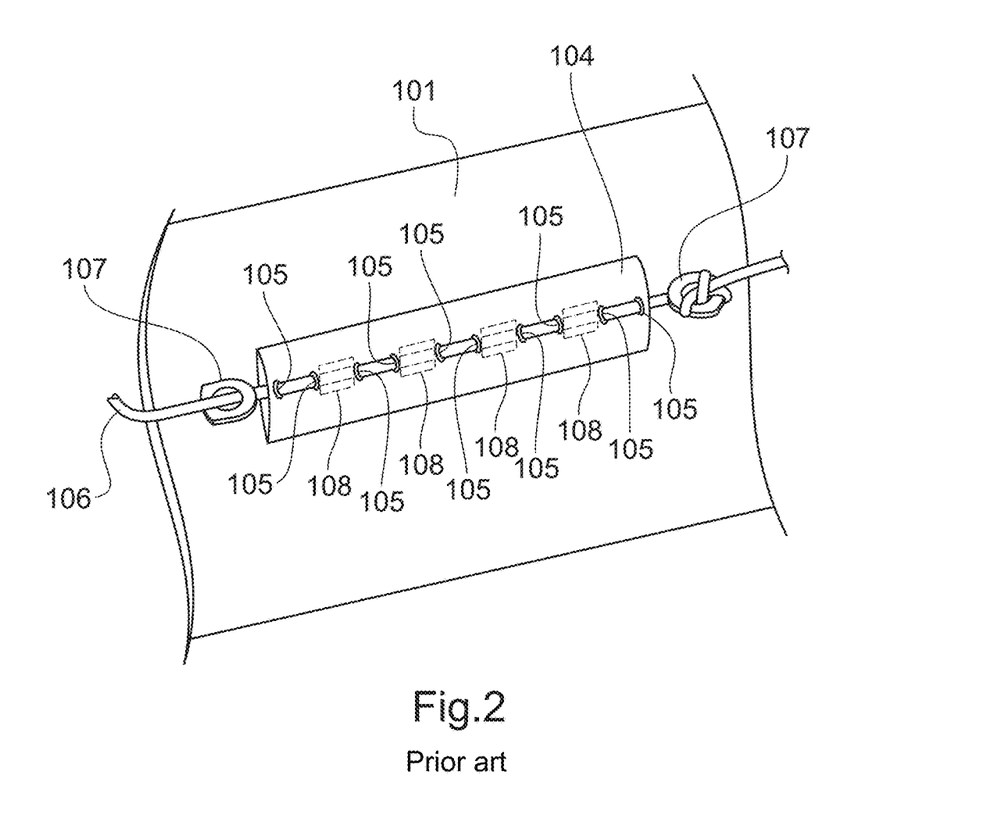

It has been proposed, in French patent FR2960468 B1 and in French patent application FR3004376 A1, an inflatable articulated structure, illustrated in FIGS. 1 and 2, comprising, on the one hand, an inflatable tubular envelope 100 which contains a pressurized fluid and which has a variable geometry section 101 flanked by two fixed geometry sections 102, and, on the other hand, means for distorting said section 101 which are arranged, together with the envelope 100, to cause said section 101 to bend such that the latter keeps a substantially constant-volume.

The distorting means can comprise actuators associated to cables 103 connected to the envelope 100 such that a pulling on one of the cables causes said section 101 to bend by creating a length differential on either side of the central axis A3 of said section 101, while maintaining a cross-section of said section 101 substantially constant.

French patent FR2960468 B1 further proposes to provide folds that are substantially perpendicular to the central axis A3, ring-shaped and provided with portions which are stitched to one another along two stitch lines extending symmetrically on either side of the central axis A3 and with free portions extending also symmetrically on either side of the central axis A3. As these seams are located in areas of stress concentration, the mechanical strength and the loading capacity of the structure are determined by the quality of the seams, which seams turned out to be rather complex to made in an industrial context.

In order to overcome such a difficulty, application FR3004376 A1 proposes to provide stress-bearing means which comprise two strips 104 attached to the envelope 100 along the longitudinal direction of the latter, at diametrically opposite positions, eyelets 105 mounted in holes provided for this purpose in the strips 104 and spaced apart in the longitudinal direction, and an inextensible flexible link 106 threaded through the eyelets 105 in order to progress alternately under (in tunnel-forming portions) and over the strip 104. The ends of the links 106 are tied to tabs 107 welded on the envelope 100 at the ends of the strip 104, such that a pulling on the link 106, before its second end is tied to the corresponding tab 107, results in at least one fold being created in the strip portions located between two struts 108 each placed in a tunnel-forming portion. A decrease by 50% of the length of the variable geometry section 101 results in the creation of folds allowing said section 101 to bend, by pulling on the cable 103 one end of which is attached to the envelope 100, at around 90° in a half-plane P of said section 101, on either side of which the distorting means are provided. In order to illustrate this bending, is illustrated in FIG. 3 a gantry arch-shaped support structure formed by such an envelope 100 provided with three strips 104, which are schematically shown, one in the middle of the envelope 100 and the other two arranged symmetrically on either side of the middle of the envelope 100 so as to obtain three successive curves.

Figure 3:
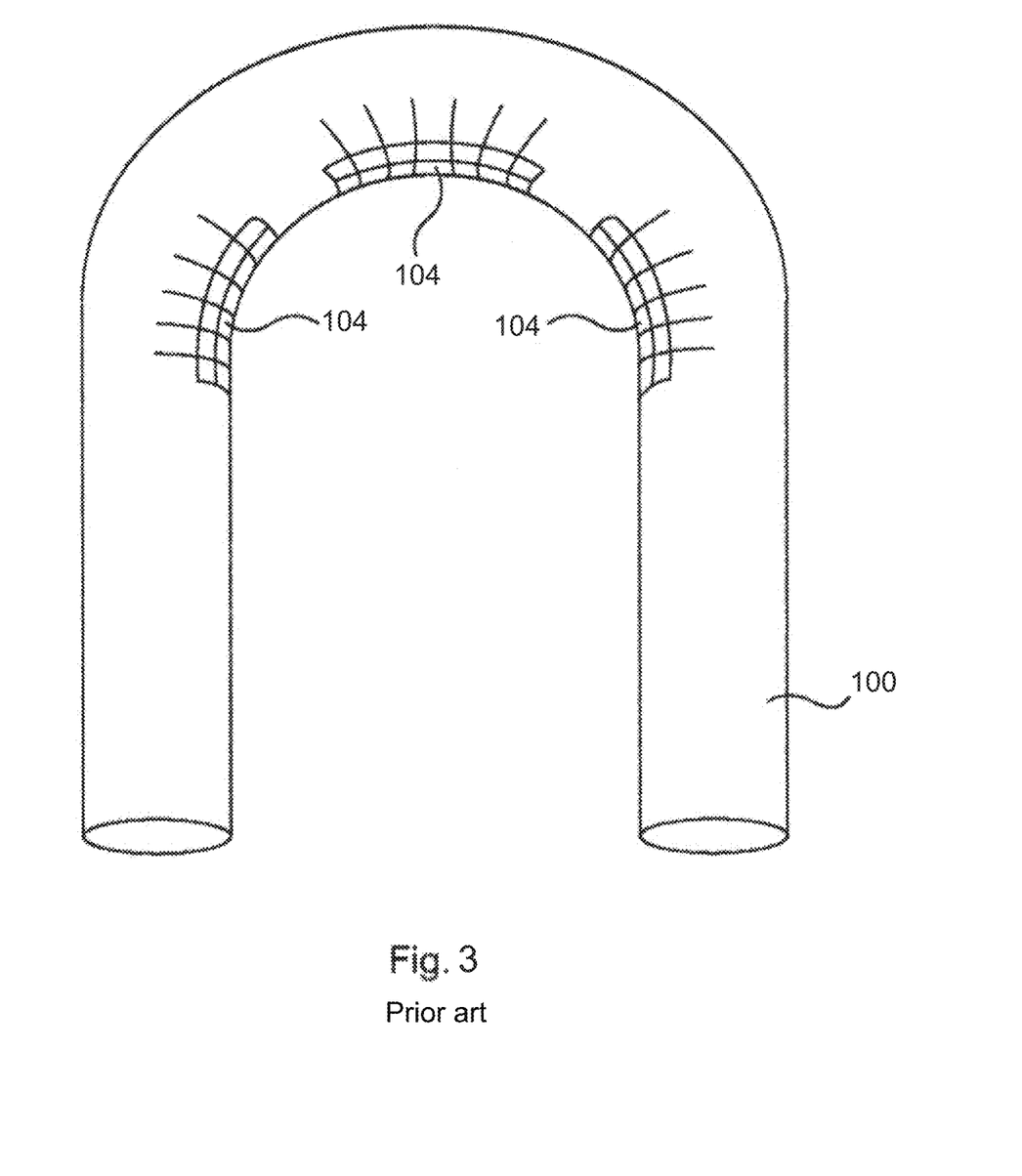
FIG. 3 is a schematic front view of a gantry-type structure in accordance with patent application FR3004376 A1.

A drawback that the inflatable articulated structure illustrated in FIGS. 1 to 3 presents is that, in practice, the variable geometry section could be caused to take any other shape than that expected, so long as it keeps its volume or increases it, as for example S or elbow shapes, which can result in the occurrence of bulges. In the event the inflatable articulated structure is used as part of a robotic arm, such bulges are major drawbacks for directing the arm.

It is therefore necessary to avoid the variable geometry section from being able to adopt a shape other than that desired, which therefore requires said section to be constrained in the desired shape. Such a constraint will be obtained by a particular actuation of said section, which actuation will be selected accurately because it allows to obtain the desired shape.

Another drawback of such an inflatable articulated structure is that it only allows a motion in one plane, that is to say the half-plane on either side of which the distorting means are provided.

However, it will be understood that, for an application with one robotic arm, it would be particularly advantageous to have a solution allowing a motion which is not limited to a single plane.

Currently, the only inflatable joint which allows motions in several planes is the section restriction: two inflatable sections are linked only at one point, like a string of sausages. Unfortunately, it is easy to understand that such a joint with section restriction does not have any torsional rigidity because the quadratic surface of the joint is null, which makes it unusable in practice.

SUMMARY OF THE INVENTION

The present invention therefore aims to meet the need for a constant-volume joint allowing motions not limited to a single plane, while having a satisfactory torsional rigidity.

According to the present invention, such a need can be met by an inflatable tube provided with means allowing the longitudinal tensile stresses, which are exerted by the internal pressure within the inflatable tube, to be born not on the surface, as in prior art, but on the central axis of the inflatable tube. Thus, as for a joint with section restriction, in such an inflatable tube all the tensile stresses are born at at least one point on the central axis, but, as a result of the cross-section of the inflatable tube not being null, the inflatable tube has some torsional rigidity which makes it usable in practice, for instance for an application with one robotic arm.

The subject-matter of the present invention is thus a variable geometry and constant-volume inflatable tube, comprising an inflatable envelope made of impermeable flexible material and having a central axis, the inflatable tube further comprising means for bearing longitudinal tensile stress applied to the envelope by the internal pressure within the latter, wherein the stress-bearing means comprise pairs of a first and a second inextensible linking means extending inside the envelope, said pairs being distributed in N longitudinal half-planes of the envelope, each extending between the central axis of the envelope and a respective generatrix of the surface of the envelope, N being an integer divisor of 360 and greater than or equal to 2, and in that, in each longitudinal half-plane, the at least one first inextensible linking means of said longitudinal half-plane is oriented along a first longitudinal direction which is inclined with respect to the central axis of the envelope and the at least one second inextensible linking means is oriented along a second longitudinal direction which is also inclined with respect to the central axis of the envelope, at a same angle of inclination as the first longitudinal direction, and the at least one first and the at least one second inextensible linking means are attached, at a first end, to said respective generatrix of the surface of the envelope and have a point of intersection with, for instance pass through or end on, the central axis (A) of the envelope, whereby the inflatable tube is bendable around N first pivot axes, each first pivot axis both being located in a respective longitudinal half-plane and being perpendicular to the central axis of the envelope, and around N second pivot axes, each second pivot axis being both perpendicular to the central axis and perpendicular to a respective one of the N first pivot axes, the longitudinal tensile stresses applied to the envelope by the internal pressure within the latter being concentrated on the central axis by the at least one first and the at least one second inextensible linking means, whether or not the inflatable tube is bent.

In the present application, the orientation of an inextensible linking means is the direction along which the inextensible linking means will transmit a longitudinal tensile stress applied to the envelope by the internal pressure.

Preferably, the N longitudinal half-planes are at equal angular distances from one another.

According to a particular embodiment of the present invention, the at least one first inextensible linking means and the at least one second inextensible linking means, in other words the or each of said first and second inextensible linking means, are respectively formed by a first and a second inextensible link.

The stress-bearing means may comprise, for each longitudinal half-plane, a series of first inextensible links and a series of second inextensible links, said inextensible links being arranged behind one another along the central axis of the envelope so as to form a series of pairs of first and second inextensible links.

The number N of longitudinal half-planes in which the pairs of first and second inextensible linking means are distributed may be even, whereby said pairs of first and second inextensible linking means are distributed in a number N/2 of couples of longitudinal half-planes defined such that any longitudinal half-plane is parallel to the other longitudinal half-plane with which it forms a couple, the first inextensible linking means of two longitudinal half-planes belonging to a same couple being formed by a first inextensible link or a series of first inextensible links and the second inextensible linking means of said two longitudinal half-planes being formed by a second inextensible link or a series of second inextensible links, the one or more first inextensible links crossing the one or more second inextensible links on the central axis of the envelope, first ends of the one or more first and the one or more second inextensible links being attached to a first region of the envelope while second ends of the one or more first and the one or more second inextensible links are attached to a second region of the envelope, said first and second regions of the envelope being located on either side, in the direction of the central axis of the envelope, of the crossing of said first and second longitudinal directions, the one or more first and the one or more second inextensible links bringing said first and second regions of the envelope closer such that, when over-pressurized, the latter does not have any longitudinal tension.

Providing that the stress-bearing means comprise such a series of first inextensible links and such a series of second inextensible links allows the inflatable tube to be bent on a longer length of the envelope: the amplitude of motion is increased.

According to a preferred particular arrangement, the first and second inextensible links forming the first and second inextensible linking means from any couple of longitudinal half-planes are placed sufficiently close to one another such that each of the first inextensible links crosses second inextensible links, and vice versa, the first and second inextensible links all being attached to a single third inextensible link which extends along the central axis of the envelope or all the first and second inextensible links belonging to the same couple of longitudinal half-planes are attached to a respective inextensible link which extends along the central axis of the envelope. Such an arrangement of the inextensible links once again allows to increase the range of motion of the inflatable tube. The inextensible link which extends along the central axis of the envelope is for preventing the envelope from being drawn tight during a motion with an increased amplitude.

It is be pointed out here that, in practice, the inextensible links, insofar as they cross each other and given that they have a non-zero thickness, will not be perfectly in the longitudinal half-planes. This is also true at the crossing point between two inextensible links. It will be therefore easy to understand that the present invention also includes the cases in which the inextensible linking means do not perfectly belong to a longitudinal half-plane, but, for example, are slightly shifted therefrom, so long as the longitudinal tensile stresses applied to the envelope can be transmitted along the first and second directions of the inextensible linking means so as to be concentrated on the central axis of the envelope.

For example, the number N of longitudinal half-planes in which the pairs of first and second inextensible linking means are distributed is equal to 4, and both couples of longitudinal half-planes are, preferably, perpendicular to each other.

According to another embodiment of the present invention, the first and second inextensible linking means belonging to a same longitudinal half-plane comprise a strip made of fibrous inextensible material, first fibers of which are oriented along said first longitudinal direction and second fibers of which are oriented along said second longitudinal direction, each strip being attached, at a so-called external longitudinal edge, to the envelope, and being connected, at a so-called internal longitudinal edge, to an inextensible link.

For example, the number N of longitudinal half-planes in which the pairs of first and second inextensible linking means are distributed is equal to 4 and the longitudinal half-planes are at equal angular distances from one another, the inflatable tube comprising a first strip assembly formed by first and second ones of said strips extending in a first longitudinal mid-plane of the envelope, and a second strip assembly formed by third and fourth ones of said strips, said third and fourth strips extending in a second longitudinal mid-plane of the envelope which is perpendicular to said first longitudinal mid-plane, each of the first to fourth strips of material being connected, at a so-called internal longitudinal edge, to an inextensible link which extends along the central axis of the envelope, and being attached, at a so-called external longitudinal edge, to the envelope.

According to the present invention, in both aforementioned embodiments, the inflatable tube will be able to be set in motion passively, that is to say by an action outside the inflatable tube, as, for example, by pulling on one or more actuating cables as in the prior art. To that end, the envelope could have, along its external surface, means for directing at least one control cable that is for bending the inflatable tube.

Alternately, still according to the present invention, the inflatable tube will be able to be set in motion actively, that is to say by varying the internal pressures inside different independent volumes which are defined in the envelope, in either one of both aforementioned embodiments.

Thus, when the stress-bearing means define, inside the envelope, a number N of compartments separated from one another by the inextensible linking means, the envelope will be able to have N inflatable chambers, each formed in or by a respective compartment, each inflatable chamber comprising a fluid inlet and a fluid outlet so as to allow the inflation and the deflation of said inflatable chamber. It is easy to imagine that the tube can thus be divided into 3, 4, etc., compartments.

An over-pressure in a chamber causes an increase in the volume thereof and, therefore, a corresponding bending of the inflatable tube. Thus, in case four compartments are defined in the envelope, if, for example, both chambers that are located on a same side of said first longitudinal mid-plane of the envelope are over-pressurized, then the inflatable tube will be bent in the opposite direction around the first pivot axis.

Preferably, the envelope is formed by a fabric the fibers of which are arranged aslant with respect to the central axis of the envelope, preferably at an angle of 45°. This allows the inflatable tube to better transmit the torsion stresses which are applied thereto at an end.

The subject-matter of the present invention is also a robotic arm, wherein it comprises:

at least one inflatable tube as defined above, or several such inflatable tubes which are, or not, in fluid communication in succession, a tool carried at a distal end of the arm, which distal end is formed by the end of an inflatable tube that is closed, for instance by seams or by the tool, means for actuating the tool, means for sealingly linking to fluid injection means for injecting a fluid into the arm, for instance at a proximal end of the arm in case the inflatable tubes are in fluid communication in succession, or otherwise at each of the inflatable tubes, said proximal end being formed by an end, which is a closed or not, of the inflatable tube, and means for controlling the motion of the at least one inflatable tube around the first N and second N pivot axes.

The subject-matter of the present invention is also a robot, wherein it comprises at least one robotic arm as defined above, fluid injection means sealingly linked to the at least one robotic arm, for instance at the proximal end of the latter or at each of its inflatable tubes, so as to inject a fluid into the at least one robotic arm for its inflation, and control means controlling the means for controlling the motion of the at least one inflatable tube and the means for actuating the tool.

The present invention also relates to a robotic arm, wherein it comprises:

at least one inflatable tube as defined above, or several such inflatable tubes which are, or not, in fluid communication in succession, a tool carried at a distal end of the arm, said distal end being formed by the end of an inflatable tube that is closed, for instance by seams or by the tool, means for actuating the tool, fluid injection means for injecting a fluid into the arm, for instance at a proximal end of the arm in case the inflatable tubes are in fluid communication in succession, or otherwise at each of the inflatable tubes, said proximal end being formed by an end, which is closed or not, of an inflatable tube, and means for controlling the motion of the at least one inflatable tube around the first N and second N pivot axes.

The present invention also relates to a robot, wherein it comprises at least one robotic arm as defined above, means for controlling the fluid injection means and control means controlling the means for controlling the motion of the at least one inflatable tube and the means for actuating the tool.

The inflatable tube can thus be inflated using a fluid such as: pure gas, gas mixture, liquid(s), etc.

The fluid injection means may be an external fluid intake source or a pressurized fluid internal source, such as a gas cartridge.

BRIEF DESCRIPTION OF THE DRAWINGS

In order to better illustrate the subject-matter of the present invention, several particular embodiments thereof will be described hereinafter, with reference to the accompanying drawings.

In these drawings.

DESCRIPTION OF THE PREFERRED EMBODIMENTS

Figure 4:
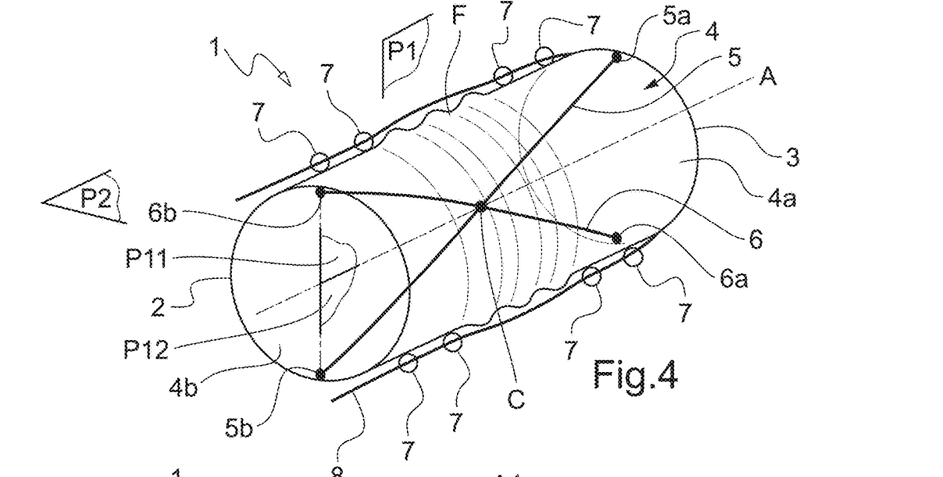
FIG. 4 is a perspective schematic view of a part of a robotic arm according to the first embodiment of the present invention.

Firstly, with reference to FIG. 4, it can be seen that a part of a robotic arm according to the first embodiment of the present invention is shown schematically therein.

Such a robotic arm comprises an inflatable tube 1 which is configured to be inflated by an air-type fluid or a liquid-type fluid, even an heterogeneous mixture comprising solids, and has a fluid inlet end 2 and a fluid outlet end 3. The fluid inlet and fluid outlet ends 2, 3 can advantageously be combined.

The fluid inlet and fluid outlet ends 2, 3 are schematically shown in FIG. 4. Thus, the fluid inlet end 2 can be sealingly linked to a compressor or to a fan, in order to cause a fluid to flow to the fluid outlet end 3 and thus to inflate the inflatable tube 1. The fluid inlet end 2 can also be closed, a gas cartridge causing the fluid to flow to the fluid outlet end 3 in order to inflate the inflatable tube 1.

The fluid outlet end 3 is in turn closed, and may, when the inflatable tube 1 is used on a robotic arm or a robot, carry a tool.

The inflatable tube 1 comprises an envelope 4 made of an impermeable flexible material, for example, a vinyl film, a polyamide fabric coated with polyurethane, polyvinyl chloride (PVC), or the like.

In the non-restrictive embodiment shown in the Figures, the envelope 4 has a circular cross-section, but the present invention, of course, is not limited to such an aspect, and the envelope 4 may have any cross-section, for example, a square or oval cross-section. However, the envelope 4 has a central axis A.

The inflatable tube 1 is noteworthy in that it further comprises a first inextensible link 5 and a second inextensible link 6 which form stress-bearing means allowing to concentrate on the central axis A of the envelope 4 the longitudinal tensile stress applied to the envelope 4.

To that end, the first inextensible link 5 is attached, at a first end 5a, to the internal surface of the envelope 4, in a first region 4a of the latter, and, at a second end 5b, also to the internal surface of the envelope 4 but in a second region 4b of the latter. The points where the ends 5a, 5b of the first inextensible link 5 are attached to the envelope 4 are selected so that the first inextensible link 5 crosses the central axis A of the envelope 4. In other words, the first inextensible link 5 belongs to a first longitudinal mid-plane P1 of the envelope 4.

Likewise, the second inextensible link 6 has the same length as the first inextensible link 5 and is attached, at its first and second ends 6a, 6b, to the internal surface of the envelope 4, respectively in the first region 4a and in the second region 4b of the envelope 4. The points where the second inextensible link 6 is attached are further selected, on the one hand, so that they also belong to said first plane P1 and, on the other hand, so that the first and second ends 6a, 6b are located in the same cross-section of the envelope 4 as the first and second ends 5a, 5b, respectively, of the first inextensible link 5.

Consequently, the first and second inextensible links 5, 6 cross each other at a crossing point C which is located on the central axis A of the envelope 4.

Furthermore, both cross-sections of the envelope 4 in which said ends 5a, 5b, 6a, 6b of the inextensible links 5, 6 are attached, are selected in order to be spaced apart, before attaching the inextensible links 5, 6, by a distance slightly greater than that between said two cross-sections after attaching the inextensible links 5, 6. Thus, the inextensible links 5, 6, once attached, will bring both regions 4a, 4b closer, avoiding the envelope 4 from being drawn tight longitudinally, with, for example, the formation of a gather F. In other words, in such a state, deflated or without any over-pressure, the envelope 4 does not have any longitudinal tension on its surface.

Are schematically shown pass through members 7, for example of the type similar to the tabs 107 of patent application FR3004376 A1 illustrated in FIGS. 1 to 3, which are regularly distributed on the outside of the envelope 4 along two lines which are diametrically opposite and belong to the first plane P1. Such pass through members are for directing a cable 8 constituting a means for controlling the motion of the inflatable tube 1.

It should be pointed out here that, for better visibility of the Figures, only two lines of pass through members 7 are shown in the first plane P1. However, likewise, two lines of pass through members 7 which are diametrically opposite and belong to a second longitudinal mid-plane P2 perpendicular to said first plane P1 will be provided, a cable 8 also extending along such each line.

As in the prior art, an end of each cable 8 is attached to the envelope 4, here at the first region 4a, while the other end is connected to means for controlling the cable.

Figure 5:
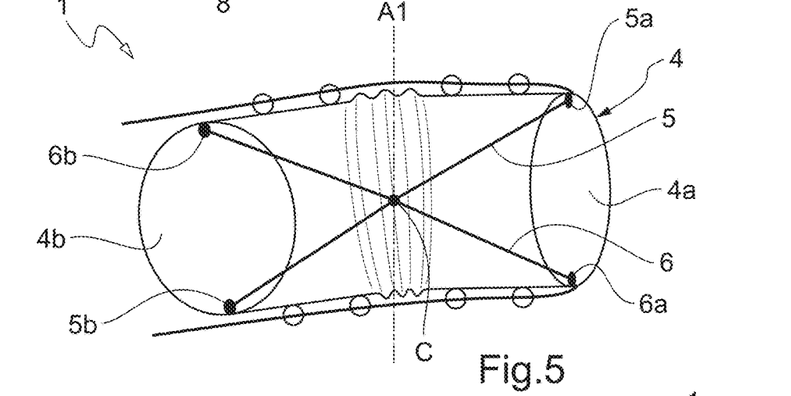
FIGS. 5 and 6 are perspective schematic views of the arm in FIG. 4, shown after being bent around a first pivot axis and a second pivot axis, respectively.

Now, with reference to FIG. 5, it can be seen that the inflatable tube 1 is shown therein after one of the cables 8 extending in the second plane P2 has been pulled, thus making the inflatable tube 1 bend to the right when observing FIG. 5, the first region 4a of the envelope 4 moving with respect to the second region 4b as if it was pivoting around a first pivot axis A1, which is vertical here. The first pivot axis A1 passes through the central axis A and belongs to the first plane P1.

Figure 6:
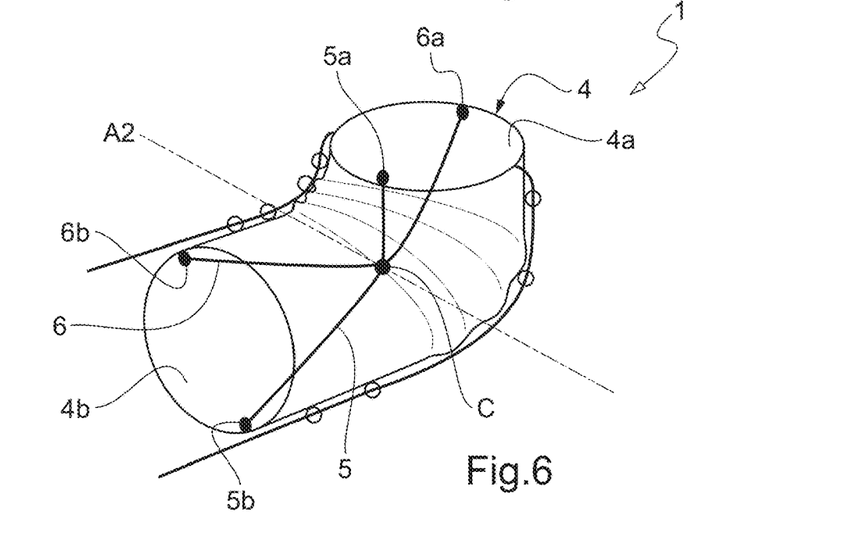

Now, with reference to FIG. 6, it can be seen that the inflatable tube 1 is shown therein after the cable 8 located above the envelope 4 in FIG. 1 and therefore extending in the first plane P1 has been pulled, thus making the inflatable tube 1 bend upwards when observing FIG. 6, the first region 4a of the envelope 4 moving with respect to the second region 4b as if it was pivoting around a second pivot axis A2, which is horizontal here. The second pivot axis A2 passes through the central axis A and belongs to the second plane P2.

Thus, it can be noticed that the inflatable tube 1 according to the present invention allows a motion which is not limited to one plane, while keeping a constant-volume and a non-zero quadratic surface, and therefore a satisfactory torsional rigidity.

This is made possible because the first and second inextensible links 5, 6, since they are attached to the surface of the envelope 4 and are inextensible, concentrate at their crossing point C, that is to say on the central axis A of the envelope 4, the longitudinal tensile stresses applied on the surface of the envelope 4, which result from the internal pressure within the envelope 4. The crossing point C will thus constitute the pivot center around which the inflatable tube 1 can bend.

Figure 7:
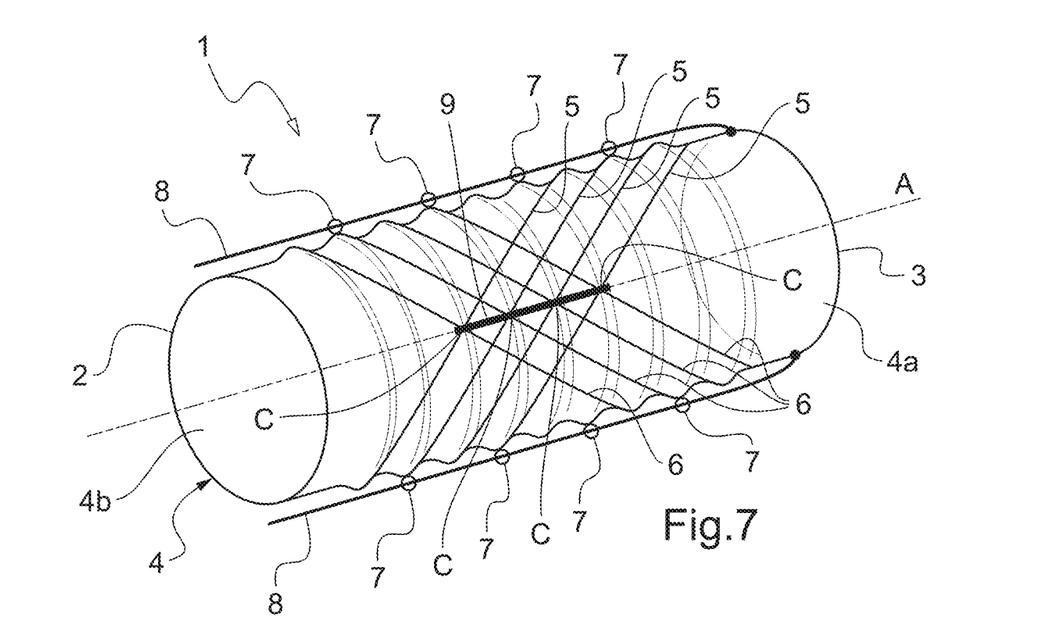
FIG. 7 is a perspective schematic view of the arm according to a variant of the first embodiment.
Figure 8:
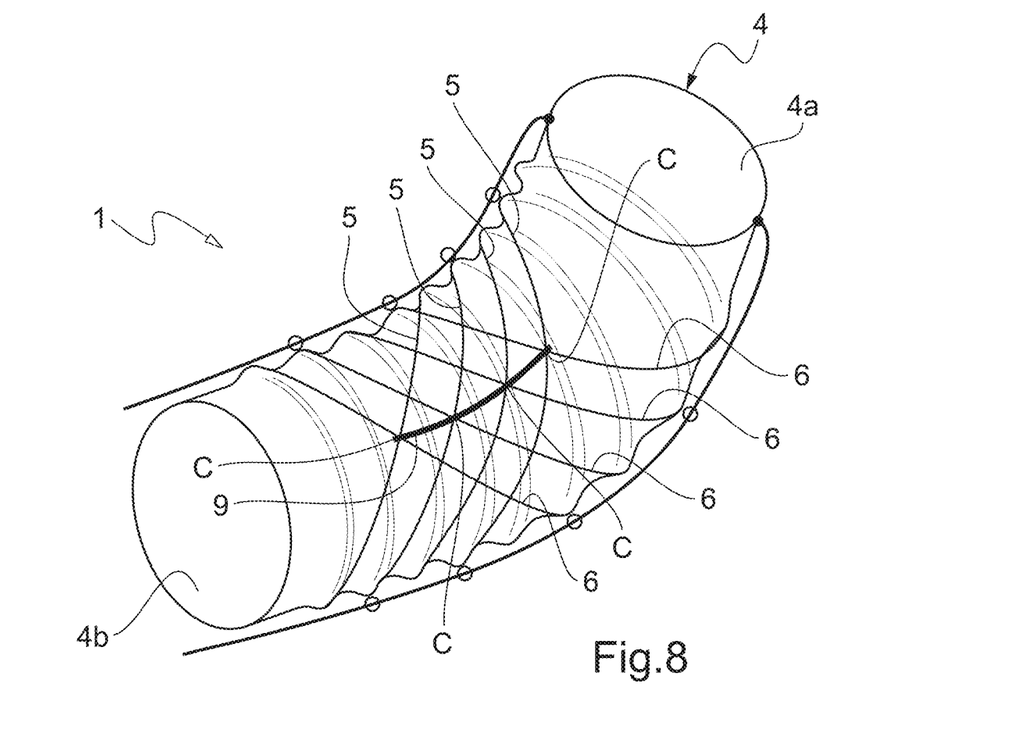
FIG. 8 is a perspective schematic view of the arm in FIG. 7, shown after being bent around a second pivot axis.

Now, with reference to FIGS. 7 and 8, it can be seen that an inflatable tube according to a variant of the first embodiment in FIGS. 4 to 6, is shown schematically therein.

Such an inflatable tube, also designated by the reference FIG. 1, distinguishes itself from that shown in FIGS. 4 to 6 only in that a series of first inextensible links 5 parallel to one another and a series of second inextensible links 6, also parallel to one another and in the same number as the first inextensible links 5, are provided.

The first and second inextensible links 5, 6 are arranged close enough to one another in order that each first inextensible link 5 crosses several second inextensible links 6, and vice versa. However, the first and second inextensible links 5, 6 are advantageously arranged in pairs, such that each first inextensible link 5 has a corresponding second inextensible link 6 that it crosses at a crossing point C on the central axis A of the envelope 4.

In order to avoid the envelope 4 from being drawn tight, a third inextensible link 9 is attached, by any suitable means, to the first and second inextensible links 5, 6, at all the crossing points C. In other words, the third inextensible link 9 also extends along the central axis A of the envelope 4. The third inextensible link 9 is shorter than the envelope 4, in order to avoid it from being drawn tight. The shorter the third inextensible link 9 is, the larger the amplitude of motion is.

The inflatable tube 1 here again comprises the pass through members 7 and the cables 8 and it can be set in motion around the first and second pivot axes A1 and A2. In FIG. 8, the inflatable tube 1 is shown in the position similar to FIG. 6, that is to say after bending around the second pivot axis A2.

The utility of the configuration of the first and second inextensible links 5, 6 as illustrated in FIGS. 7 and 8 is to increase the amplitude of motion of the inflatable tube 1.

The first embodiment illustrated in FIGS. 4 to 8 is only a particular configuration of the principle which forms the basis of the present invention. In such a first embodiment, it can be considered that the one or more first and the one or more second inextensible links 5, 6 are distributed in a couple of longitudinal half-planes P11 and P12 of the envelope 4, only the traces of which are illustrated in FIG. 4, and each longitudinal half-plane P11 and P12 extends between the central axis A and a respective generatrix of the envelope 4 which belongs to the first longitudinal mid-plane P1. Thus, the first and second inextensible links 5, 6 respectively form, in each half-plane P11 and P12, the first and second inextensible linking means of the present invention.

The interest of the first embodiment described above is that a same inextensible link forms inextensible linking means in two longitudinal half-planes of the envelope.

Of course, it would be possible to provide, for each half-plane P11 and P12, a pair of first and second inextensible links first ends of which are attached to a respective end region of the envelope and the second ends of which are attached to one another at a point located on the central axis of the envelope.

Now, with reference to FIGS. 9 to 13, it can be seen that an inflatable tube 10 according to a second embodiment of the present invention is shown therein, which embodiment is based on the same principle of concentrating on the central axis A, by inextensible linking means, longitudinal tensile stresses exerted on the envelope when the inflatable tube 10 is pressurized.

Figure 9:
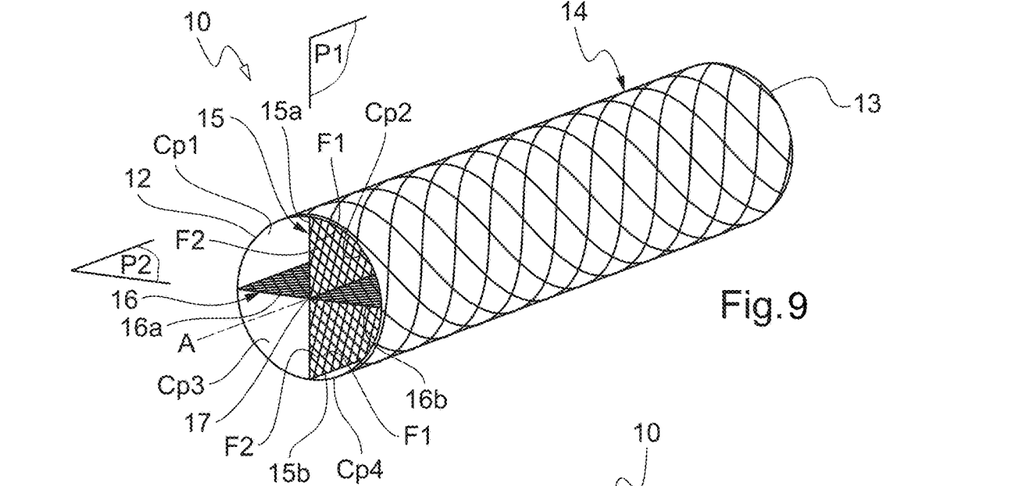
FIG. 9 is a perspective schematic view of an inflatable tube according to the second embodiment of the present invention.

The inflatable tube 10 here again comprises fluid inlet 12 and fluid outlet 13 ends on the same principle as the ends 2 and 3 of the first embodiment, and an envelope 4.

The inflatable tube 10 is noteworthy in that the inextensible linking means extend both in the first longitudinal mid-plane P1 of the envelope 14, but also in the second longitudinal mid-plane P2, thus dividing the inside of the envelope 14 into four compartments Cp1, Cp2, Cp3 and Cp4.

Such a configuration allows to distribute the stresses even better in the envelope 14 when the inflatable tube 10 bends.

It is illustrated in a schematic way in FIG. 9 the fact that the envelope 14 is made of a fabric the fibers of which are arranged aslant with respect to the central axis A of the envelope 14, which allows to better transmit, along the inflatable tube 10, the torsion stresses. In particular, first fibers are oriented along said first longitudinal direction, while second fibers are oriented along said second longitudinal direction. It should be pointed out here that such a feature of the envelope 14 can also be applied to the envelope 4 according to the first embodiment.

In this second embodiment, the inextensible linking means are formed by a first strip assembly 15 in the first plane P1 and a second strip assembly 16 in the second plane P2, which assemblies 15, 16 cross each other on the central axis A of the envelope 14.

The first strip assembly 15 comprises first and second strips 15a, 15b of a fibrous inextensible material first fibers F1 of which are oriented along said first longitudinal direction and second fibers F2 of which are oriented along said second longitudinal direction. Likewise, the second strip assembly 16 comprises third and fourth strips 16a, 16b of a fibrous inextensible material first fibers F1 of which are oriented along said first longitudinal direction and second fibers F2 of which are oriented along said second longitudinal direction.

An inextensible link 17 extends along the central axis A and the first to fourth strips of inextensible material 15a, 15b, 16a, 16b are attached thereto by any suitable means.

It is easy to understand that, because of the orientation of said fibers F1 and F2, the first to fourth strips of inextensible material have the same function of concentrating the longitudinal tensile stresses, exerted on the envelope 4, on the central axis A of the latter when the inflatable tube 10 is pressurized.

Thus, although they have not been shown, here again it will be possible to provide pass through members and cables to set the inflatable tube 10 in motion passively, by pulling on a cable.

Figure 10:
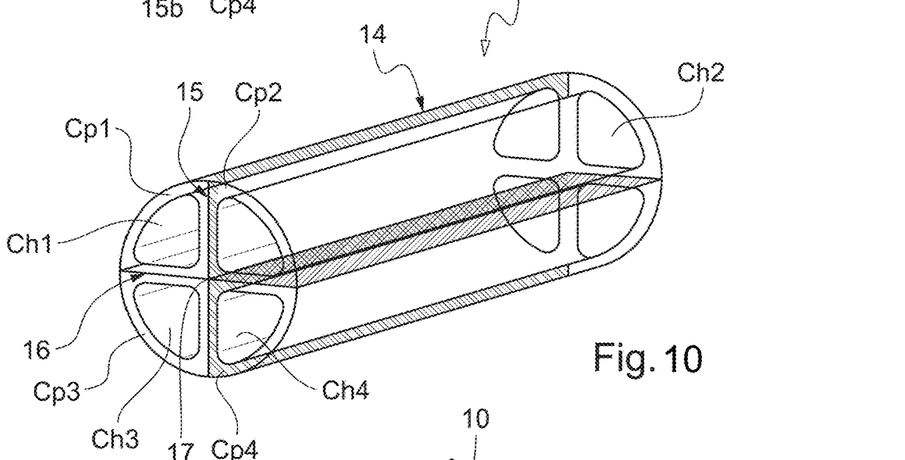
FIG. 10 is a perspective schematic view of a variant of the second embodiment.

However, as illustrated in FIG. 10, an advantage of the principle which forms the basis of the second operating mode, is that it is possible to provide, in each compartment Cp1, Cp2, Cp3 and Cp4, an inflatable chamber Ch1, Ch2, Ch3, Ch4 which will be independent from the other chambers. Each chamber Ch1, Ch2, Ch3, Ch4 will thus be provided with a fluid inlet and a fluid outlet, which advantageously will be combined.

The chambers Ch1, Ch2, Ch3, Ch4 thus form means for controlling the motion of the inflatable tube 10, by over-pressurizing some of the chambers Ch1, Ch2, Ch3, Ch4 and deflating others.

Figure 11:
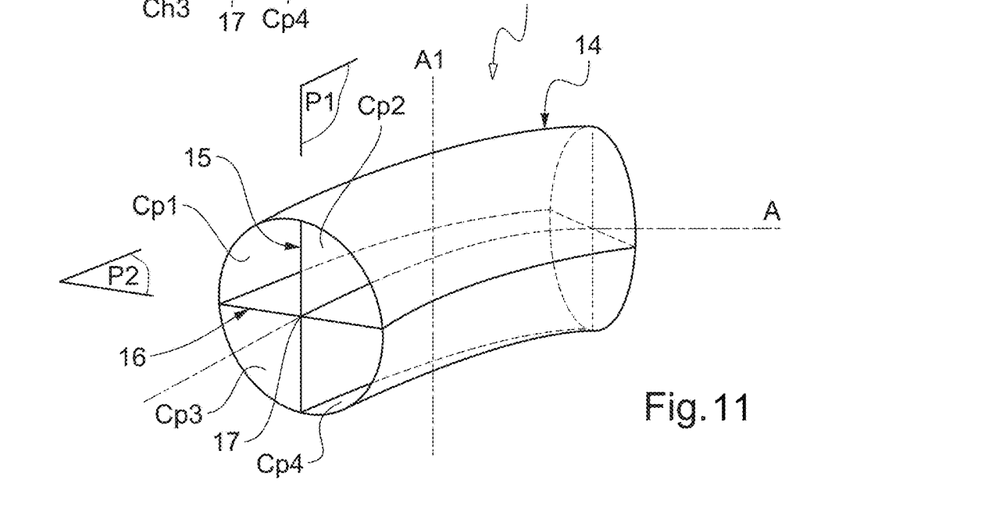
FIG. 11 is a schematic view of an inflatable tube in accordance with the second embodiment and its variant, shown after being bent around a first pivot axis.

For example, in FIG. 11 the inflatable tube 10 is illustrated when the chambers Ch1 and Ch3 (not shown), which are located on the same side as the first plane P1, but on either side of the second plane P2, are over-pressurized while deflating the chambers Ch2 and Ch4 (not shown): the inflatable tube 10 is bent around the first pivot axis A1 in the same way as illustrated in FIG. 5 for the first embodiment.

Likewise:
an over-pressure in the chambers Ch2 and Ch4 and a deflation of the chambers Ch1 and Ch3 result in the inflatable tube 10 bending around the first pivot axis A1, but in the direction opposite to that illustrated in FIG. 11;
an over-pressure in the chambers Ch3 and Ch4 and a deflation of the chambers Ch1 and Ch2 result in the inflatable tube 10 bending around the second pivot axis A2, in the same way as illustrated in FIG. 6 for the first embodiment; and an over-pressure in the chambers Ch1 and Ch2 and a deflation of the chambers Ch3 and Ch4 result in the inflatable tube 10 bending around the second pivot axis A2, but in the opposite direction.

It can therefore be noticed that the inflatable tube 10 allows a motion which is not limited to one plane, while keeping a constant-volume and a non-zero quadratic surface, and therefore a satisfactory torsional rigidity, with a setting in motion actively.

The chambers Ch1, Ch2, Ch3, Ch4 could be formed by bladders inserted into the different compartments Cp1, Cp2 Cp3, Cp4, or could be directly formed by said compartments, in which case the envelope 14 and the first to fourth strips of material 15a, 15b, 16a, 16b will be made of impermeable material.

It should be pointed out here that it can also be considered, in the second embodiment illustrated in FIGS. 9 to 11, that the first and second strip assemblies 15, 16 are distributed in two couples of longitudinal half-planes, as for the first embodiment illustrated in FIGS. 4 to 8: for each longitudinal half-plane, the first and second inextensible means are formed by the fibers of the respective strip 15a, 15b, 16a, 16b.

Now, with reference to FIGS. 12 and 13, it will be described an exemplary method for manufacturing the inflatable tube 10, in which the envelope 14 and the first to fourth strips 15a, 15b, 16a, 16b are formed together with one another.

In a first step, two rectangular pieces of fabric M1 and M2 (FIG. 12), first fibers of which are inclined along said first longitudinal direction and second fibers of which are inclined along said second longitudinal direction, the inclination being here with respect to an axial direction of the pieces of fabric, are arranged on top of each other.

These two pieces of fabric M1 and M2 are joined to each other along their center lines, for example by stitching.

Figure 12:
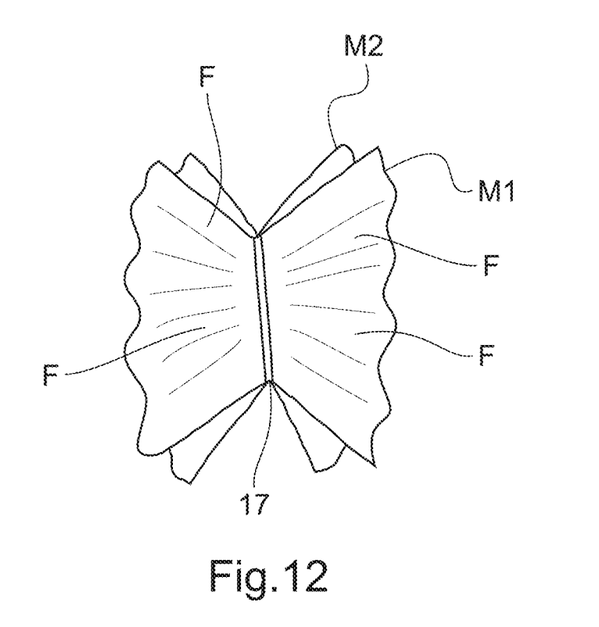
FIG. 12 is a schematic view of the inflatable tube according to the second embodiment, when being manufactured according to an exemplary manufacturing method.
Figure 13:
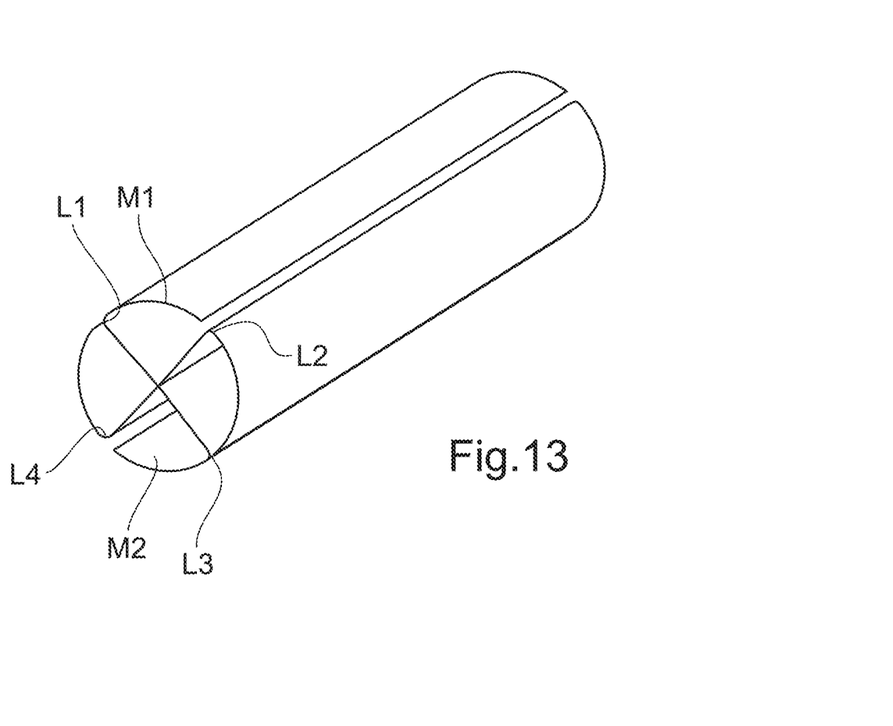
FIG. 13 is a perspective schematic view of the inflatable tube obtained with such an exemplary manufacturing method.

As illustrated in FIG. 12, gathers F are made on the same seam, which gathers F are blocked by stitching the inextensible link 17 on top thereof. Providing such gathers F allows to increase the amplitude of motion of the inflatable tube 10 obtained.

At this stage, the inextensible link 17 separates each piece M1, M2 into two regions on either side of the inextensible link 17. For the piece M1 located on the top, the region on the left of the inextensible link 17 in FIG. 12 is folded upwards around a folding line L1 (FIG. 13), and the external region is then brought back inwards following an arc of circle, while the region on the right of the inextensible link 17 is first of all turned upwards along the inextensible link 17, then folded outwards around a folding line L2, then the external region is brought back downwards following an arc of circle.

The procedure is the same for the piece M2, the region on the right of the inextensible link 17 being folded downwards around a folding line L3, then brought back inwards following an arc of circle, while the region on the left is folded downwards along the inextensible link 17, then folded outwards around a folding line L4, then brought back upwards following an arc of circle.

The configuration illustrated in FIG. 12 is then obtained, configuration from which the free longitudinal edges are joined by any suitable means, as for example by stitching, to the adjacent part of the piece M1 or M2, so as to obtain the inflatable tube 10.

It can therefore be noted that the manufacturing of the inflatable tube 10 can be implemented easily in an industrial context.

Of course, the above embodiments of the present invention were provided for information purposes only and not as a restriction, and modifications thereto will be possible without departing from the scope of the present invention.

Thus, for example, the division of the inflatable tube into independent compartments could be obtained using inextensible linking means formed by inextensible links of the type of those used in the first embodiment in FIGS. 4 to 8. The inextensible links belonging to the first plane P1 could be attached to a third inextensible link and the inextensible links belonging to the second plane P2 could be attached to a fourth inextensible link, on the same principle as that illustrated in FIGS. 7 and 8. Alternately, all the inextensible links, whether they belong to the first plane P1 or to the second plane P2, could be attached to a same third inextensible link extending along the central axis A of the envelope 14.

Likewise, although the cases in which the pairs of first and second inextensible linking means are distributed in two longitudinal half-planes (first embodiment) or in four longitudinal half-planes (second embodiment) are illustrated in the drawings, the present invention is, of course, not limited to this number N of longitudinal half-planes, and it may be provided that said pairs of first and second inextensible linking means are distributed in three, five, six, etc., longitudinal half-planes, which are not imperatively at equal angular distances from one another. The inextensible linking means could be, for example, inextensible links or strips made of fibrous inextensible material as described above, which each extend in both longitudinal half-planes of a same couple or only in one of both longitudinal half-planes of a same couple.

The invention claimed is:

1. A variable geometry and constant-volume inflatable tube, comprising an inflatable envelope made of impermeable flexible material and having a central axis, the inflatable tube further comprising means for bearing longitudinal tensile stress applied to the envelope by the internal pressure within the latter, wherein the stress-bearing means comprise pairs of a first and a second inextensible linking means extending inside the envelope, said pairs being distributed in N longitudinal half-planes of the envelope, each extending between the central axis of the envelope and a respective generatrix of the surface of the envelope, N being an integer divisor of 360 and greater than or equal to 2, and in that, in each longitudinal half-plane, the at least one first inextensible linking means of said longitudinal half-plane is oriented along a first longitudinal direction which is inclined with respect to the central axis of the envelope and the at least one second inextensible linking means is oriented along a second longitudinal direction which is also inclined with respect to the central axis of the envelope, at a same angle of inclination as the first longitudinal direction, and the at least one first and the at least one second inextensible linking means are attached, at a first end, to said respective generatrix of the surface of the envelope and have a point of intersection with the central axis of the envelope, whereby the inflatable tube is bendable around N first pivot axes, each first pivot axis both being located in a respective longitudinal half-plane and being perpendicular to the central axis of the envelope, and around N second pivot axes, each second pivot axis being both perpendicular to the central axis and perpendicular to a respective one of the N first pivot axes, the longitudinal tensile stresses applied to the envelope by the internal pressure within the latter being concentrated on the central axis by the at least one first and the at least one second inextensible linking means, whether or not the inflatable tube is bent.

2. The inflatable tube according to claim 1, wherein the at least one first inextensible linking means and the at least one second inextensible linking means are respectively formed by a first and a second inextensible link.

3. The inflatable tube according to claim 2, wherein the stress-bearing means comprise, for each longitudinal half-plane, a series of first inextensible links and a series of second inextensible links, said inextensible links being arranged behind one another along the central axis of the envelope so as to form a series of pairs of first and second inextensible links.

4. The inflatable tube according to claim 2, wherein the number N of longitudinal half-planes in which the pairs of first and second inextensible linking means are distributed is even, whereby said pairs of first and second inextensible linking means are distributed in a number N/2 of couples of longitudinal half-planes defined such that any longitudinal half-plane is parallel to the other longitudinal half-plane with which it forms a couple, the first inextensible linking means of two longitudinal half-planes belonging to a same couple being formed by a first inextensible link and the second inextensible linking means of said two longitudinal half-planes being formed by a second inextensible link, the first inextensible link crossing the second inextensible link on the central axis of the envelope, first ends of the first and second inextensible links being attached to a first region of the envelope while second ends of the first and second inextensible links are attached to a second region of the envelope, said first and second regions of the envelope being located on either side, in the direction of the central axis of the envelope, of the crossing of said first and second longitudinal directions, the first and second inextensible links bringing said first and second regions of the envelope closer such that, when over-pressurized, the latter does not have any longitudinal tension.

5. The inflatable tube according to claim 3, wherein the number N of longitudinal half-planes in which the pairs of first and second inextensible linking means are distributed is even, whereby said pairs of first and second inextensible linking means are distributed in a number N/2 of couples of longitudinal half-planes defined such that any longitudinal half-plane is parallel to the other longitudinal half-plane with which it forms a couple, the first inextensible linking means of two longitudinal half-planes belonging to a same couple being formed by a series of first inextensible links and the second inextensible linking means of said two longitudinal half-planes being formed by a series of second inextensible links, the first inextensible links crossing the second inextensible links on the central axis of the envelope, first ends of the first and second inextensible links being attached to a first region of the envelope while second ends of the first and second inextensible links are attached to a second region of the envelope, said first and second regions of the envelope being located on either side, in the direction of the central axis of the envelope, of the crossing of said first and second longitudinal directions, the first and second inextensible links bringing said first and second regions of the envelope closer such that, when over-pressurized, the latter does not have any longitudinal tension.

6. The inflatable tube according to claim 5, wherein the first and second inextensible links forming the first and second inextensible linking means of any couple of longitudinal half-planes are placed sufficiently close to one another such that each of the first inextensible links crosses second inextensible links, and vice versa, the first and second inextensible links all being attached to a single third inextensible link which extends along the central axis of the envelope.

7. The inflatable tube according to claim 5, wherein the number N of longitudinal half-planes in which the pairs of first and second inextensible linking means are distributed is equal to 4, and both couples of longitudinal half-planes are perpendicular to each other.

8. The inflatable tube according to claim 1, wherein the first and second inextensible linking means belonging to a same longitudinal half-plane comprise a strip made of fibrous inextensible material, first fibers of which are oriented along said first longitudinal direction and second fibers of which are oriented along said second longitudinal direction, each strip being attached, at a so-called external longitudinal edge, to the envelope, and being connected, at a so-called internal longitudinal edge, to an inextensible link.

9. The inflatable tube according to claim 8, wherein the number N of longitudinal half-planes in which the pairs of first and second inextensible linking means are distributed is equal to 4 and in that the longitudinal half-planes are at equal angular distances from one another, the inflatable tube comprising a first strip assembly formed by first and second ones of said strips extending in a first longitudinal mid-plane of the envelope, and a second strip assembly formed by third and fourth ones of said strips, said third and fourth strips extending in a second longitudinal mid-plane of the envelope which is perpendicular to said first longitudinal mid-plane, each of the first to fourth strips of material being connected, at a so-called internal longitudinal edge, to an inextensible link which extends along the central axis of the envelope, and being attached, at a so-called external longitudinal edge, to the envelope.

10. The inflatable tube according to claim 1, wherein the envelope has, along its external surface, means for directing at least one control cable that is for bending the inflatable tube.

11. The inflatable tube according to claim 3, wherein the stress-bearing means define, inside the envelope, a number N of compartments separated from one another by the inextensible linking means, wherein the envelope has N inflatable chambers, each formed in a respective compartment, each inflatable chamber comprising a fluid inlet and a fluid outlet so as to allow the inflation and the deflation of said inflatable chamber.

12. The inflatable tube according to claim 8, wherein the stress-bearing means define, inside the envelope, a number N of compartments separated from one another by the inextensible linking means, wherein the envelope has N inflatable chambers, each formed in a respective compartment, each inflatable chamber comprising a fluid inlet and a fluid outlet so as to allow the inflation and the deflation of said inflatable chamber.

13. The inflatable tube according to claim 1, wherein the envelope is formed by a fabric the fibers of which are arranged aslant with respect to the central axis of the envelope, at an angle of 45°.

14. The inflatable tube according to claim 1, wherein the N longitudinal half-planes are at equal angular distances from one another.

15. A robotic arm, wherein it comprises:
at least one inflatable tube according to claim 1,
a tool carried at a distal end of the arm, which distal end is formed by the end of an inflatable tube that is closed, means for actuating the tool, means for sealingly linking to fluid injection means for injecting a fluid into the arm, and means for controlling the motion of the at least one inflatable tube around the first N and second N pivot axes.

16. The robotic arm according to claim 15, wherein it comprises several inflatable tubes.

17. A robot, wherein it comprises at least one robotic arm according to claim 15, fluid injection means sealingly linked to the at least one robotic arm so as to inject a fluid into the at least one robotic arm for its inflation, and control means controlling the means for controlling the motion of the at least one inflatable tube and the means for actuating the tool.

18. A robotic arm, wherein it comprises:

at least one inflatable tube according to claim 1, a tool carried at a distal end of the arm, said distal end being formed by the end of an inflatable tube that is closed, means for actuating the tool, fluid injection means for injecting a fluid into the arm, and means for controlling the motion of the at least one inflatable tube around the first N and second N pivot axes.

19. The robotic arm according to claim 18, wherein it comprises several inflatable tubes.

20. A robot, wherein it comprises at least one robotic arm according to claim 18, means for controlling the fluid injection means and control means controlling the means for controlling the motion of the at least one inflatable tube and the means for actuating the tool.

* * * * *